US011001168B2

(12) United States Patent
Simoni et al.

(10) Patent No.: US 11,001,168 B2
(45) Date of Patent: May 11, 2021

(54) SEAT WITH OCCUPANCY DETECTION

(71) Applicant: ALSTOM Transport Technologies, Saint-Ouen-sur-Seine (FR)

(72) Inventors: Bastian Simoni, Nogent sur Marne (FR); Selim Dagdag, Momeres (FR)

(73) Assignee: ALSTOM TRANSPORT TECHNOLOGIES, Saint-Ouen-sur-Seine (FR)

( * ) Notice: Subject to any disclaimer, the term of this patent is extended or adjusted under 35 U.S.C. 154(b) by 0 days.

(21) Appl. No.: 16/741,079

(22) Filed: Jan. 13, 2020

(65) Prior Publication Data
US 2020/0223324 A1 Jul. 16, 2020

(30) Foreign Application Priority Data

Jan. 15, 2019 (FR) ........................................ 1900354

(51) Int. Cl.
*B60N 2/00* (2006.01)
*B60R 21/015* (2006.01)
*B60R 16/023* (2006.01)
*B61D 33/00* (2006.01)

(52) U.S. Cl.
CPC ............ *B60N 2/002* (2013.01); *B60R 16/023* (2013.01); *B60R 21/01526* (2014.10); *B61D 33/0007* (2013.01)

(58) Field of Classification Search
CPC . B60N 2/002; B60R 21/01526; B60R 16/023; B61D 33/0007
USPC ...................................................... 340/667
See application file for complete search history.

(56) References Cited

U.S. PATENT DOCUMENTS

| 5,482,314 | A | * | 1/1996 | Corrado | ................ G01S 15/523 280/735 |
| 7,476,861 | B2 | | 1/2009 | Yajima et al. | |
| 7,542,836 | B1 | * | 6/2009 | Norton | .............. B60R 21/01532 280/728.1 |
| 2002/0080014 | A1 | * | 6/2002 | McCarthy | .............. B60N 2/002 340/426.1 |
| 2006/0180764 | A1 | * | 8/2006 | Yajima | ................ B60R 21/0154 250/349 |
| 2007/0125586 | A1 | * | 6/2007 | Decoster | ........... B60R 21/01526 180/272 |
| 2012/0313588 | A1 | * | 12/2012 | Carberry | .............. H05B 47/105 320/134 |

(Continued)

FOREIGN PATENT DOCUMENTS

| EP | 2456145 | 5/2012 |
| EP | 2730479 | 5/2014 |
| WO | WO-2014/044610 | 3/2014 |

OTHER PUBLICATIONS

Preliminary Search Report for French Application No. 1900354 dated for Nov. 22, 2019.

*Primary Examiner* — Kerri L McNally
(74) *Attorney, Agent, or Firm* — B. Aaron Schulman, Esq.; Stites & Harbison, PLLC

(57) ABSTRACT

The present invention relates to a seat (20), in particular for a vehicle, comprising a first sensor (32) arranged in order to generate a first electrical signal upon a user seating themselves on a seat (20) and upon the vacating of the seat (20) by the user.
The seat (20) also comprises a second sensor (34) that is capable of generating a second electrical signal in a substantially continuous or repeated manner when the user is seated on the seat (20).

15 Claims, 4 Drawing Sheets

(56) References Cited

U.S. PATENT DOCUMENTS

| | | | |
|---|---|---|---|
| 2014/0125355 A1* | 5/2014 | Grant | G01R 27/2605 |
| | | | 324/629 |
| 2014/0169404 A1* | 6/2014 | Lam | B60N 2/002 |
| | | | 374/179 |
| 2016/0031394 A1 | 2/2016 | Irish et al. | |
| 2016/0037238 A1* | 2/2016 | Salvador | H04Q 9/00 |
| | | | 340/870.09 |
| 2018/0284319 A1* | 10/2018 | Hergott | A47C 1/13 |

* cited by examiner

SEAT WITH OCCUPANCY DETECTION

FIELD OF THE INVENTION

The present invention relates to a seat, in particular for a vehicle, comprising a first sensor arranged in order to generate a first electrical signal upon a user seating themselves on a seat and upon the vacating of the seat by the user.

BACKGROUND OF THE INVENTION

In the rail transport industry, it is useful to know in real time the occupancy status of the seats in a vehicle, in a centralised manner, for example in order to detect the seats that are unoccupied and be able to direct users to them.

In order to do this, it is a known practice to use a detection system that comprises presence sensors mounted on the seats and communicates with a centralised data acquisition module.

Such a system is able to operate with a wired connection from each sensor to the data acquisition module, which makes possible the transfer of information and data and provides for the supply of electrical power the sensors. However, such a system is complex to install and renders the maintenance operations tedious and cumbersome. In addition, the proliferation of wired communications elements is a hindrance in the limited space of a railway vehicle.

Wireless sensors that can function without direct power supply provide the means to overcome this problem. The sensors include for example a battery so as to supply them with the electrical energy necessary for their operation. However, the sensors are integrated directly into the volume of the seating base of the seat, and replacing of the depleted battery requires the complete disassembling of the seat, which constitutes a tedious operation.

It is also a known technique to use energy harvesting sensors that are capable of producing their own electrical energy by means of physical effects, for example by exploiting the piezoelectric effect.

Such sensors generate energy, notably in the form of an electrical voltage when they are activated, in particular when a user is getting seated on the seat or getting up therefrom. The electrical voltage thus generated is sufficient in order to temporarily power a communication module that signals that a user has either seated themselves or gotten up from the seat. These detection systems thus operate in an autonomous manner without requiring an electrical supply.

However, these systems do not provide total satisfaction. Indeed, they are not able to differentiate between a user who is getting seated and a user who is getting up, and only communicate changes of status to the centralised data acquisition module. In the event of information being lost in the communication, the status of the seat can be considered by the system as the opposite of its actual status, without the possibility of being corrected.

BRIEF SUMMARY OF THE INVENTION

An object of the invention is therefore to provide a system for detecting whether the seats of a railway vehicle are occupied thereby making it possible to have more precise and more reliable information as to the status of each seat. Other objectives of the invention are to ensure that the detection system is able to operate wirelessly and in an autonomous manner.

To this end, the object of the invention relates to a seat of the aforementioned type, in which the seat also comprises a second sensor that is capable of generating a second electrical signal in a substantially continuous or repeated manner when the user is seated on the seat.

According to particular embodiments, the seat according to the invention has one or more of the characteristic features given below, taken into consideration independently or in accordance with any technically feasible combination:

the seat comprises a communication module configured so as to transmit onward to a data acquisition module a primary signal when the first sensor generates the first electrical signal, and a secondary signal when the user is seated on the seat and the second sensor generates the second electrical signal;

the first sensor and the second sensor are energy harvesting sensors;

the communication module is an autonomous module, which is electrically powered only by the first sensor and the second sensor;

the first sensor comprises at least one piezoelectric transducer;

the first sensor comprises a plurality of piezoelectric transducers that are distributed under a seating base and/or the back rest of a seat, the first sensor being configured so as to detect the user seating themselves on the seat or the vacating of the seat by the user, and to generate the first signal when at least a predetermined number of the piezoelectric transducers undergo a variation in mechanical stress;

the second sensor comprises at least one thermopile arranged under a seating base or the back rest of the seat, with the thermopile having a first surface that extends so as to be facing the seating base or back rest and a second surface that extends away from the seating base or back rest;

the communication module is configured so as to stop transmitting the secondary signal following the vacating of the seat by the user, even if the second sensor were to continue to emit the second signal on account of the seating base or the back rest having a residual temperature; and the second surface of the thermopile is connected by a thermal conductor to a metal structure of the seat.

The object of the invention also relates to a railway vehicle, in particular a railway vehicle, comprising a plurality of seats as described here above, and a data acquisition module that is capable of receiving signals based on the first and/or the second signal, and of determining the occupied or vacant status of each of the seats as a function of the signals received.

The object of the invention additionally also relates to an occupancy detection method for detecting the occupying of a seat by a user as described here above, the method comprising the following steps:

the user seating themselves on the seat and applying of a pressure by the user on the seat;

generation of the first signal by the first sensor and transmission of a primary signal being sent to a data acquisition module;

reception of the primary signal by the data acquisition module and determination of a change of status of the seat to an occupied status;

occupying of the seat by the user and generation in a continuous or repeated manner of the second signal by the second sensor and continuous or repeated transmission of a secondary signal being sent to the data acquisition module;

reception of the secondary signal by the data acquisition module and confirmation of the occupied status of the seat, or correction of an erroneous vacant status by the data acquisition module;

vacating of the seat by the user, generation of the first signal by the first sensor and transmission of the primary signal being sent to the data acquisition module; and reception of the primary signal by the data acquisition module and determination of a change of status of the seat to a vacant status.

According to particular embodiments, the method according to the invention presents one or more of the characteristic features given here below, taken into consideration independently or in accordance with any technically feasible combination:

the step of vacating the seat includes the stopping of the repeated transmission of the secondary signal.

the primary signal comprises three redundant frames, with the data acquisition module determining the change of status of the seat by the reception of at least one of the said frames.

BRIEF DESCRIPTION OF THE DRAWING FIGURE

The invention will be better understood upon reading the description which follows, given solely by way of example and with reference being made to the appended drawings, among which:

DETAILED DESCRIPTION OF EXEMPLARY EMBODIMENTS

Figure 1:
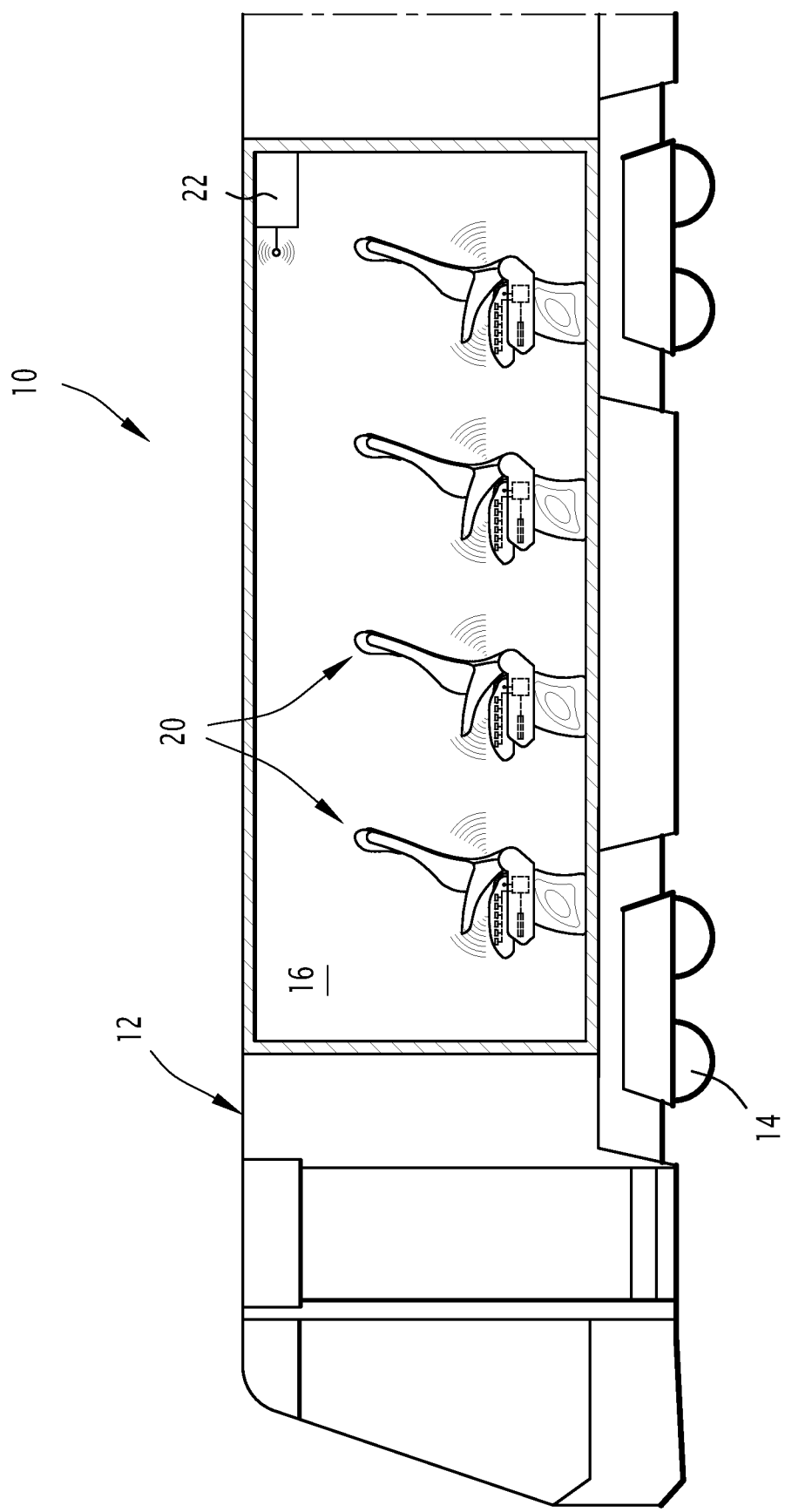
FIG. 1 is a view from the side and in partial cross section of a railway vehicle according to the invention.

The railway vehicle 10 represented in FIG. 1 comprises a body 12 mounted on wheels 14 and defining a compartment 16 intended to accommodate travellers.

This railway vehicle 10 comprises a plurality of seats 20 arranged in the compartment 16, each seat 20 being capable of accommodating one traveller in the seated position.

The railway vehicle 10 also comprises a data acquisition module 22, arranged for example in the compartment 16, which is capable of communicating with the seats 20.

Figure 2:
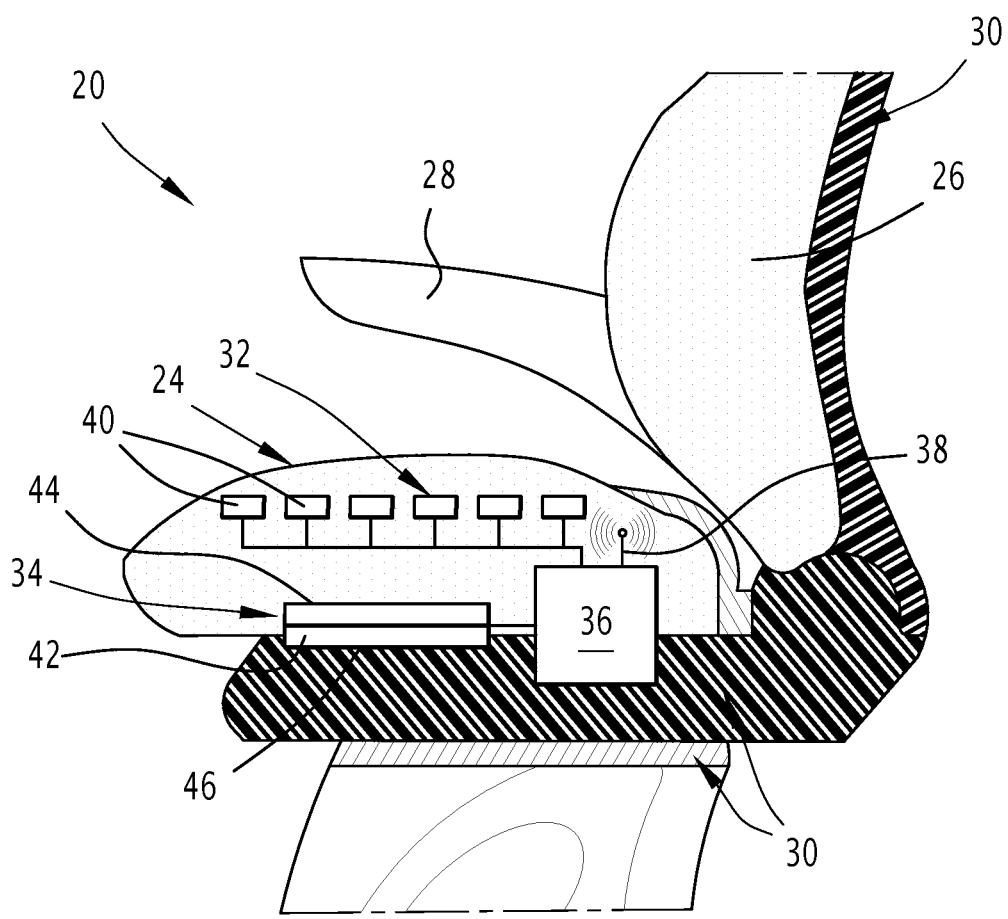
FIG. 2 is a cross sectional view of a seat of the railway vehicle shown in FIG. 1, according to a first variant embodiment of the invention.

As represented in FIG. 2, each seat 20 comprises a seating base 24, a back rest 26 and advantageously at least one armrest 28, as well as a structure 30 bearing the seating base 24, the back rest 26 and each armrest 28.

The seating base 24 constitutes in particular a top surface of a cushion, in a manner so as to enhance the comfort of the user of the seat 20.

The structure 30 comprises a metal part forming a rigid frame, and a part made of rigid plastic material that is attached to the metal part and serves to improve the aesthetic appearance of the seat 20.

Each seat 20 in addition comprises a first sensor 32, a second sensor 34 and a communication module 36.

The first sensors, second sensors and communication modules of the seats 20, as well as the data acquisition module 22, together form an occupancy monitoring system for monitoring the occupancy of the seats 20, that is capable of determining in a centralised manner the occupied status or vacant status of each of the seats 20.

The first sensor 32 is installed in the seating base 24 of the seat 20, and is capable of detecting an instance of a user seating themselves on the seat 20 or the vacating of the seat 20 by the user, and of transmitting a first electrical signal following the said detection.

More precisely, the first sensor 32 is capable of detecting changes in the status of the seat 20, that is to say when it changes from the vacant status to the occupied status or vice versa.

The second sensor 34 is also installed in the seating base 24 of the seat 20, and is capable of detecting the occupancy of the seat 20 by a user, and of transmitting a second electrical signal in a substantially continuous or repeated manner as long as the seat 20 is occupied.

The term "substantially continuous", is understood to indicate that the transmission of the second electrical signal by the second sensor 34 takes place in a continuous manner over a majority of the duration of the said transmission, and that the interruptions or discontinuities of this transmission represent a negligible part of this duration, for example less than 5%.

Advantageously, the first sensor 32 and the second sensor 34 are energy harvesting sensors.

The term "energy harvesting sensor", is understood to indicate that the sensor harvests energy from an external source during the course of the detection process that it carries out, and that at least a part of this energy harvested constitutes the electrical signal generated by the sensor as an outcome following the detection.

Advantageously, the first sensor 32 and the second sensor 34 are capable of transmitting the first and second electrical signals to be sent to the communication module 36.

The communication module 36 is electrically connected to the first sensor 32 and to the second sensor 34 in a manner so as to receive the first electrical signal and the second electrical signal. It is moreover capable of communicating with the data acquisition module 22 of the railway vehicle 10.

The communication module 36 is advantageously configured so as to transmit a primary signal to be sent to the data acquisition module 22 upon reception of the first electrical signal transmitted by the first sensor 32, and to transmit on a repeated basis a secondary signal upon reception of the second electrical signal transmitted on a substantially continuous basis by the second sensor 34.

Advantageously, the communication module 36 comprises an antenna 38 and is capable of communicating with the data acquisition module 22 of the railway vehicle 10 in accordance with a wireless communication protocol, for example the Wi-Fi or EnOcean protocol.

Advantageously, the communication module 36 is a self-contained autonomous module, electrically powered only by the first and second sensors 32, 34. This is understood to indicate that the communication module 36 and the first and second sensors 32, 34 are not connected to an external energy source, and that the energy used for the sending of the primary signal and the secondary signal is fully supplied by the first and second sensors 32, 34, through the first electrical signal and the second electrical signal respectively.

The primary signal is transmitted by the communication module 36 to the data acquisition module 22, in order to signal a change in the status of the seat 20 from occupied to vacant, or vice versa.

The primary signal advantageously comprises three redundant frames, that is to say that the primary signal comprises an information item that is repeated identically three times in succession. As the primary signal is only transmitted once at the time of the change of status of the seat 20, this makes it possible to reduce the risks of loss of information during the course of transmission to the data acquisition module 22.

The secondary signal comprises a single frame, sent on a repeated basis to the data acquisition module 22, and which confirms the occupied status of the seat 20. As it is transmitted on a repeated basis, the non-reception of one of the occurrences of the secondary signal does not pose a problem.

The primary signal and the secondary signal include information items which in particular make it possible for the data acquisition module 22 to identify the seat 20 that is transmitting the latter.

In the preferred embodiment represented in the figures, the first sensor 32 comprises a plurality of piezoelectric transducers 40, and the second sensor 34 comprises at least one thermopile 42.

Each piezoelectric transducer 40 is capable of generating an electrical voltage when it is subjected to a mechanical stress which varies over time.

The piezoelectric transducers 40 are distributed over the seating base 24 of the seat 20, in a manner so as to generate an electrical voltage when a user is getting seated on the seat 20 or getting up therefrom, this consequently causing to vary a mechanical stress exerted by the user on the seating base 24 and transmitted to the piezoelectric transducers 40.

Thus, the first sensor 32 is adapted so as to transmit the first signal to be sent to the communication module 36 in the form of an electrical voltage generated by the piezoelectric transducers 40 when the user is getting seated or getting up.

Advantageously, the occupancy monitoring system for monitoring the occupancy of the seat 20 is adapted so as to determine whether a variation in mechanical stress on the seating base 24 corresponds to a user who is getting seated or getting up, or to another cause, for example the placing of a luggage item on the seat 20.

To this end, the piezoelectric transducers 40 of the first sensor 32 are for example connected in series, in a manner such that the electrical voltages produced by the piezoelectric transducers 40 subjected to the variation in mechanical stress get added up together. These summed up electrical voltages form the first signal, which then has a variable amplitude that varies as a function of the number of piezoelectric transducers 40 subjected to the variation in stress.

The communication module 36, in this case, is configured so as to compare the amplitude of the first signal to a predetermined detection threshold value, and to send the primary signal onward to the data acquisition module 22 only if the amplitude of the first signal is greater than or equal to the detection threshold value.

Figure 3:
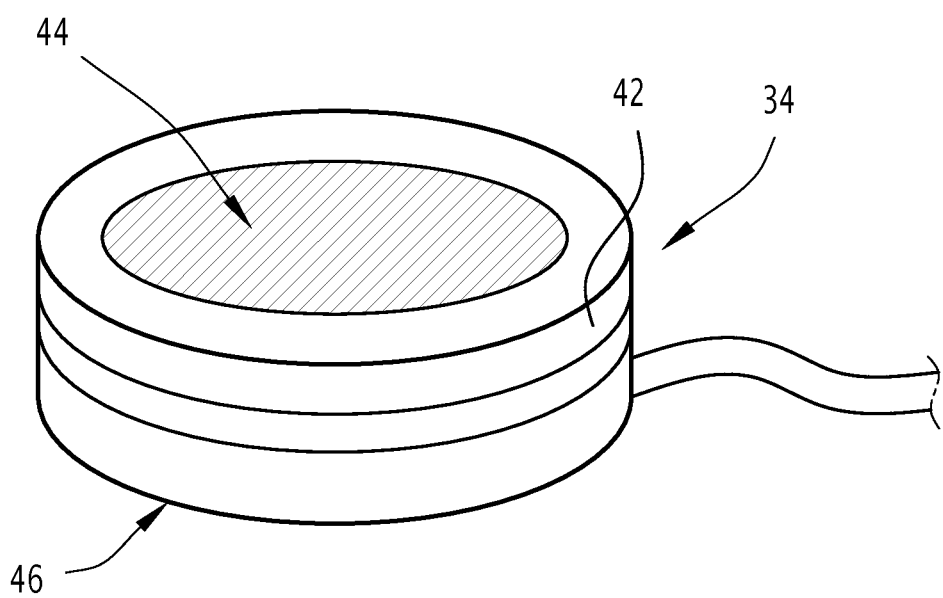
FIG. 3 is a perspective view of a thermopile of the seat shown in FIG. 2.

Each thermopile 42, as shown in FIG. 3, has two opposite surfaces, of which a first surface 44 is oriented to be facing the seating base 24 and a second surface 46 is oriented to be facing away from the seating base 24. The thermopile 42 is capable of generating an electrical voltage in a continuous manner, with an amplitude that is proportional to a difference between the temperatures of the two surfaces 44, 46.

The thermopile 42 converts the thermal energy emitted by the user who is occupying the seat 20 and thus warming the seating base 24 into electrical energy, in the form of the electrical voltage generated, which constitutes the second signal.

Thus, the second sensor 34 is adapted so as to transmit the second signal to the communication module 36, in the form of an electrical voltage, in a substantially continuous or repeated manner, as long as the user is seated on the seat 20.

Figure 4:
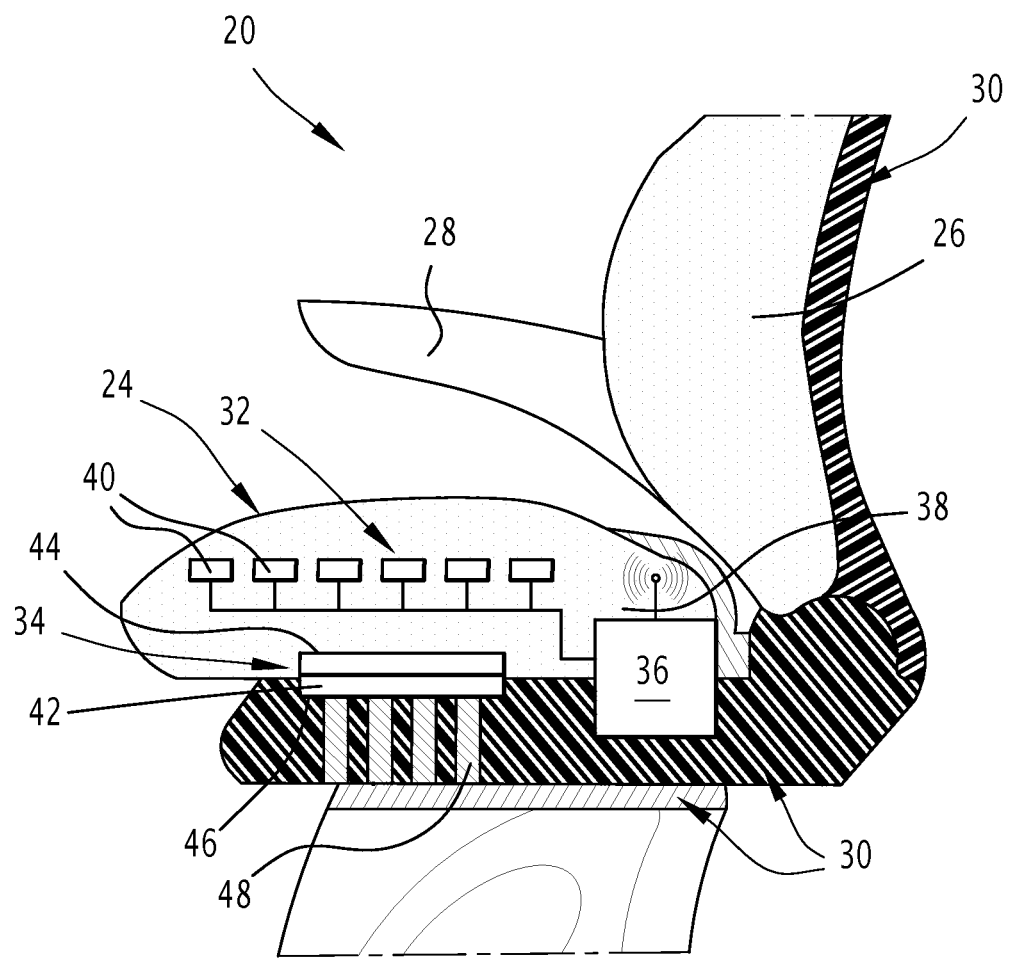
FIG. 4 is a cross sectional view of a seat of the railway vehicle shown in FIG. 1, according to a second variant embodiment of the invention.

Advantageously, as represented in FIG. 4, the second surface 46 of the thermopile 42 is connected to the metal part of the structure 30 of the seat 20 by a thermal conductor 48. The metal part of the structure 30 serves to act as a heat sink, presenting a temperature that is constant and less than or equal to the ambient temperature in the compartment 16.

Thus, the second surface 46 of the thermopile 42 is maintained at a temperature that is less than or equal to the ambient temperature in the compartment 16, despite the warming of the seating base 24 in contact with the user.

Advantageously, the communication module 36 is adapted so as to compare a value of the second electrical signal with a threshold value, which corresponds to a sufficient temperature difference between the two surfaces 44, 46 of the thermopile 42 in order to ensure the (confirmed) presence of a user on the seat 20. The threshold value corresponds for example to a temperature difference of 7° C. The communication module 36 is thus then configured so as to transmit the secondary signal only if the amplitude of the second signal is greater than or equal to the threshold value.

The data acquisition module 22 is capable of receiving the primary signals and the secondary signals emitted by each of the seats 20 and to deduce therefrom the occupied or vacant status of each seat 20.

The data acquisition module 22 is configured so as to determine that the seat 20 has changed status on reception of at least one of the frames, and the redundancy reduces the risk of loss of information, with the primary signal being transmitted only at the time instant of the change in status of the seat 20.

The data acquisition module 22 is also configured so as to correct a possible erroneous status of one of the seats 20, based on the secondary signal. Indeed, the secondary signal is transmitted only when the seat 20 is occupied, and the reception of the secondary signal by the data acquisition module 22 provides the means to correct a possible erroneous status of the seat 20 considered to be vacant as a result of an error during the transmission and reception of the primary signal.

An occupancy detection method for detecting the occupancy of a seat 20 of the railway vehicle 10 by a user will now be described.

The seat 20 is initially unoccupied, and its status is considered to be vacant by the data acquisition module 22.

The method comprises a seating step of a user seating themselves on the seat 20, thus bearing against the seating base 24.

During this step, the user exerts a stress on the top surface of the seating base 24, with this consequently causing to vary the mechanical stress applied to at least a portion of the piezoelectric transducers 40 of the first sensor 32.

The method comprises, simultaneously with a user seating themselves, a signal transmitting step of transmission of the first signal by the first sensor 32, followed by the transmission of the primary signal by the seat 20.

During this step, the varying of the mechanical stress being applied to the piezoelectric transducers 40 results in the generation by each of them of an electrical voltage. The electrical voltages generated get added up together and form the first signal, which is transmitted to the communication module 36 by means of the wired connection.

Upon reception of the first signal, the communication module 36 transmits the primary signal to the data acquisition module 22. The energy used to send the primary signal is entirely supplied by the first sensor 32, in the form of the electrical voltage that forms the first signal.

The data acquisition module 22 receives the primary signal and records a change in status of the seat 20 from vacant to occupied.

Advantageously, the primary signal comprises of three redundant frames, and the reception of at least one of the frames by the data acquisition module 22 makes it possible to determine the change of status of the seat 20.

During a seat occupation step of the seat 20 becoming occupied by the user, the user in contact with the seating base 24 thus warms the seating base 24, which raises the temperature of the first surface 44 of the or each thermopile 42 of the second sensor 34. This leads to bringing about a difference in temperature between the first surface 44 and the second surface 46.

The method then comprises a signal transmitting step of transmission of the second signal by the second sensor 34, followed by the transmission of the secondary signal by the seat 20.

During this step, an electrical voltage is generated by the or by each thermopile 42 of the second sensor 34 in a substantially continuous manner as a result of the effect of the difference in temperature between its surfaces 44, 46, and transmitted to the communication module 36. The raising of the temperature of the first surface 44 thus serves to induce the generated voltage to exceed the threshold value, and the electrical voltage is interpreted as the second signal by the communication module 36.

As long as the communication module 36 continues to receive the second signal, it transmits on a repeated basis the secondary signal to the data acquisition module 22. The data acquisition module 22 confirms the occupied status of the seat 20, or corrects the erroneous vacant status, if the reception of the first signal had failed. The energy consumed for sending the secondary signal is fully supplied by the second sensor 34, in the form of electrical voltage, by the second signal.

The method thereafter comprises a seat vacating step of the seat 20 being vacated by the user, which brings to an end the mechanical stress being applied on to the seating base 24. The mechanical stress being applied on the piezoelectric transducers 40 of the first sensor 32 therefore changes.

The method then comprises a new signal transmitting step of transmission of the first signal by the first sensor 32, followed by the transmission of the primary signal by the communication module 36 as previously described.

The primary signal is received by the data acquisition module 22, which records the change in status of the seat 20 from occupied to vacant.

Advantageously, the communication module 36 is configured so as to stop transmitting the secondary signal upon reception of the first signal, if it has previously been transmitting the secondary signal on a repeated basis for a predetermined period of time.

The first signal received thus then corresponds to the vacating of the seat 20 by the user. However, the immediate stopping of the transmission of the second signal by the second sensor 34 is not ensured.

In fact, the temperature of the seating base 24 does not instantly return to ambient temperature at the time of the seat 20 being vacated, and the communication module 36 continues to receive the second signal.

The secondary signal is thus then not sent, which consequently does not result in the correcting of the vacant status of the seat 20, for a predetermined time period that is sufficient for the seating base 24 to again return to ambient temperature.

By way of a variant, the first sensor 32 and/or the second sensor 34 are integrated into the back rest 26 and operate in exactly the same manner as described here above, and thus also detect the variations in stress and/or temperature brought about on the back rest 26 by the user seating themselves on the seat 20.

By way of a variant, the one or more seat(s) 20 and the data acquisition module 22 are installed in a vehicle other than a railway vehicle, such as for example a motor coach or a ship, or indeed in a room in a building, such as a waiting room.

The invention claimed is:

1. A seat comprising a first sensor arranged in order to generate a first electrical signal upon a user seating themselves on a seat and upon the vacating of the seat by the user,
    wherein the seat also comprises a second sensor that is capable of generating a second electrical signal in a substantially continuous or repeated manner when the user is seated on the seat,
    wherein the first sensor and the second sensor are energy harvesting sensors, and
    wherein the second sensor comprises at least one thermopile arranged under a seating base or a back rest of the seat, with the thermopile having a first surface that extends so as to be facing the seating base or the back rest and a second surface that extends away from the seating base or the back rest.

2. The seat according to claim 1, comprising a communication module configured so as to transmit onward to a data acquisition module a primary signal when the first sensor generates the first electrical signal, and a secondary signal when the user is seated on the seat and the second sensor generates the second electrical signal.

3. The seat according to claim 1, wherein the communication module is configured so as to stop transmitting the secondary signal following the vacating of the seat by the user, even if the second sensor were to continue to emit the second signal on account of the seating base or the back rest having a residual temperature.

4. The seat according to claim 1, wherein the second surface of the thermopile is connected by a thermal conductor to a metal structure of the seat.

5. The seat according to claim 2, wherein the communication module is an autonomous module, which is electrically powered only by the first sensor and the second sensor.

6. The seat according to claim 1, wherein the first sensor comprises at least one piezoelectric transducer.

7. The seat according to claim 6, wherein the first sensor comprises a plurality of piezoelectric transducers that are distributed under a seating base and/or a back rest of the seat, the first sensor being configured so as to detect the user seating themselves on the seat or the vacating of the seat by the user, and to generate the first signal when at least a predetermined number of the piezoelectric transducers undergo a variation in mechanical stress.

8. A vehicle comprising a plurality of seats according to claim 1, and a data acquisition module that is capable of receiving signals based on the first and/or the second signal, and of determining the occupied or vacant status of each of the seats as a function of the signals received.

9. An occupancy detection method for detecting the occupying of a seat by a user according to claim 1, the method comprising:
   the user seating themselves on the seat and applying of a pressure by the user on the seat;
   generation of the first signal by the first sensor and transmission of a primary signal being sent to a data acquisition module;
   reception of the primary signal by the data acquisition module and determination of a change of status of the seat to an occupied status;
   occupying of the seat by the user and generation in a continuous or repeated manner of the second signal by the second sensor and continuous or repeated transmission of a secondary signal being sent to the data acquisition module;
   reception of the secondary signal by the data acquisition module and confirmation of the occupied status of the seat, or correction of an erroneous vacant status by the data acquisition module;
   vacating of the seat by the user, generation of the first signal by the first sensor and transmission of the primary signal being sent to the data acquisition module; and
   reception of the primary signal by the data acquisition module and determination of a change of status of the seat to a vacant status.

10. The method according to claim 9, wherein vacating the seat includes the stopping of the repeated transmission of the secondary signal.

11. The method according to claim 9, wherein the primary signal comprises three redundant frames, with the data acquisition module determining the change of status of the seat by the reception of at least one of the said frames.

12. A seat comprising a first sensor arranged in order to generate a first electrical signal upon a user seating themselves on a seat and upon the vacating of the seat by the user,
   wherein the seat also comprises a second sensor that is capable of generating a second electrical signal in a substantially continuous or repeated manner when the user is seated on the seat,
   wherein the first sensor and the second sensor are energy harvesting sensors;
   wherein the first sensor comprises at least one piezoelectric transducer; and
   wherein the first sensor comprises a plurality of piezoelectric transducers that are distributed under a seating base and/or a back rest of the seat, the first sensor being configured so as to detect the user seating themselves on the seat or the vacating of the seat by the user, and to generate the first signal when at least a predetermined number of the piezoelectric transducers undergo a variation in mechanical stress.

13. An occupancy detection method for detecting the occupying of a seat by a user, said seat comprising a first sensor arranged in order to generate a first electrical signal upon a user seating themselves on a seat and upon the vacating of the seat by the user and a second sensor that is capable of generating a second electrical signal in a substantially continuous or repeated manner when the user is seated on the seat, wherein the first sensor and the second sensor are energy harvesting sensors, said method comprising:
   the user seating themselves on the seat and applying of a pressure by the user on the seat;
   generation of the first signal by the first sensor and transmission of a primary signal being sent to a data acquisition module;
   reception of the primary signal by the data acquisition module and determination of a change of status of the seat to an occupied status;
   occupying of the seat by the user and generation in a continuous or repeated manner of the second signal by the second sensor and continuous or repeated transmission of a secondary signal being sent to the data acquisition module;
   reception of the secondary signal by the data acquisition module and confirmation of the occupied status of the seat, or correction of an erroneous vacant status by the data acquisition module;
   vacating of the seat by the user, generation of the first signal by the first sensor and transmission of the primary signal being sent to the data acquisition module; and
   reception of the primary signal by the data acquisition module and determination of a change of status of the seat to a vacant status.

14. The method according to claim 13, wherein vacating the seat includes the stopping of the repeated transmission of the secondary signal.

15. The method according to claim 13, wherein the primary signal comprises three redundant frames, with the data acquisition module determining the change of status of the seat by the reception of at least one of the said frames.

* * * * *